US011148240B2

(12) United States Patent
Hohmann et al.

(10) Patent No.: US 11,148,240 B2
(45) Date of Patent: Oct. 19, 2021

(54) DEVICE FOR TIGHTENING SCREW CONNECTIONS

(71) Applicants: Jörg Hohmann, Meschede (DE); Frank Hohmann, Warstein (DE)

(72) Inventors: Jörg Hohmann, Meschede (DE); Frank Hohmann, Warstein (DE)

(*) Notice: Subject to any disclaimer, the term of this patent is extended or adjusted under 35 U.S.C. 154(b) by 325 days.

(21) Appl. No.: 16/368,966

(22) Filed: Mar. 29, 2019

(65) Prior Publication Data

US 2019/0299346 A1 Oct. 3, 2019

(30) Foreign Application Priority Data

Mar. 29, 2018 (DE) .................... 10 2018 107 653.3

(51) Int. Cl.
  *B23P 19/06* (2006.01)
  *E04H 12/08* (2006.01)
  *F03D 13/10* (2016.01)
  *F03D 13/20* (2016.01)
  *B25B 29/02* (2006.01)

(52) U.S. Cl.
  CPC ............ *B23P 19/067* (2013.01); *B25B 29/02* (2013.01); *E04H 12/085* (2013.01); *F03D 13/10* (2016.05); *F03D 13/20* (2016.05)

(58) Field of Classification Search
  CPC ...... B23P 19/067; E04H 12/085; F03D 13/10; F03D 13/20; B25B 29/02; Y02E 10/72; Y02E 10/728
  See application file for complete search history.

(56) References Cited

U.S. PATENT DOCUMENTS

| 2008/0127558 | A1* | 6/2008 | Gunton | E05F 15/603 49/139 |
| 2009/0256309 | A1* | 10/2009 | Hasegawa | G01D 5/3473 271/270 |
| 2013/0199341 | A1* | 8/2013 | Imi | B25B 21/002 81/57 |
| 2013/0292542 | A1* | 11/2013 | Hohmann | B25B 29/00 248/646 |
| 2014/0350724 | A1* | 11/2014 | Johst | F03D 13/20 700/253 |
| 2017/0087675 | A1* | 3/2017 | Hohmann | B25B 29/02 |
| 2017/0131720 | A1* | 5/2017 | Sullivan | G05D 1/0272 |
| 2018/0188079 | A1* | 7/2018 | Ko | G01D 5/34707 |

FOREIGN PATENT DOCUMENTS

EP 2 607 685 6/2013

* cited by examiner

*Primary Examiner* — Lawrence Averick
(74) *Attorney, Agent, or Firm* — Gudrun E. Huckett

(57) ABSTRACT

A device for tightening a screw connection on a flange connection is provided with a tool carrier movable along the flange connection and provided with a traction drive. A tool is arranged on the tool carrier for tightening the screw connection and rotating the nut relative to the flange connection. A control unit is provided for moving the tool carrier in longitudinal direction of the tool carrier into a working position by traction drive control signals. In the working position, the tool is opposite the screw connection to be tightened. The control unit performs, by tool control signals, tightening of the screw connection and rotating of the nut. The control unit has a travel control module with travel controller for moving the tool carrier into the working position. The travel controller stops the traction drive after a predefined travel length has been reached that is a target variable.

26 Claims, 8 Drawing Sheets

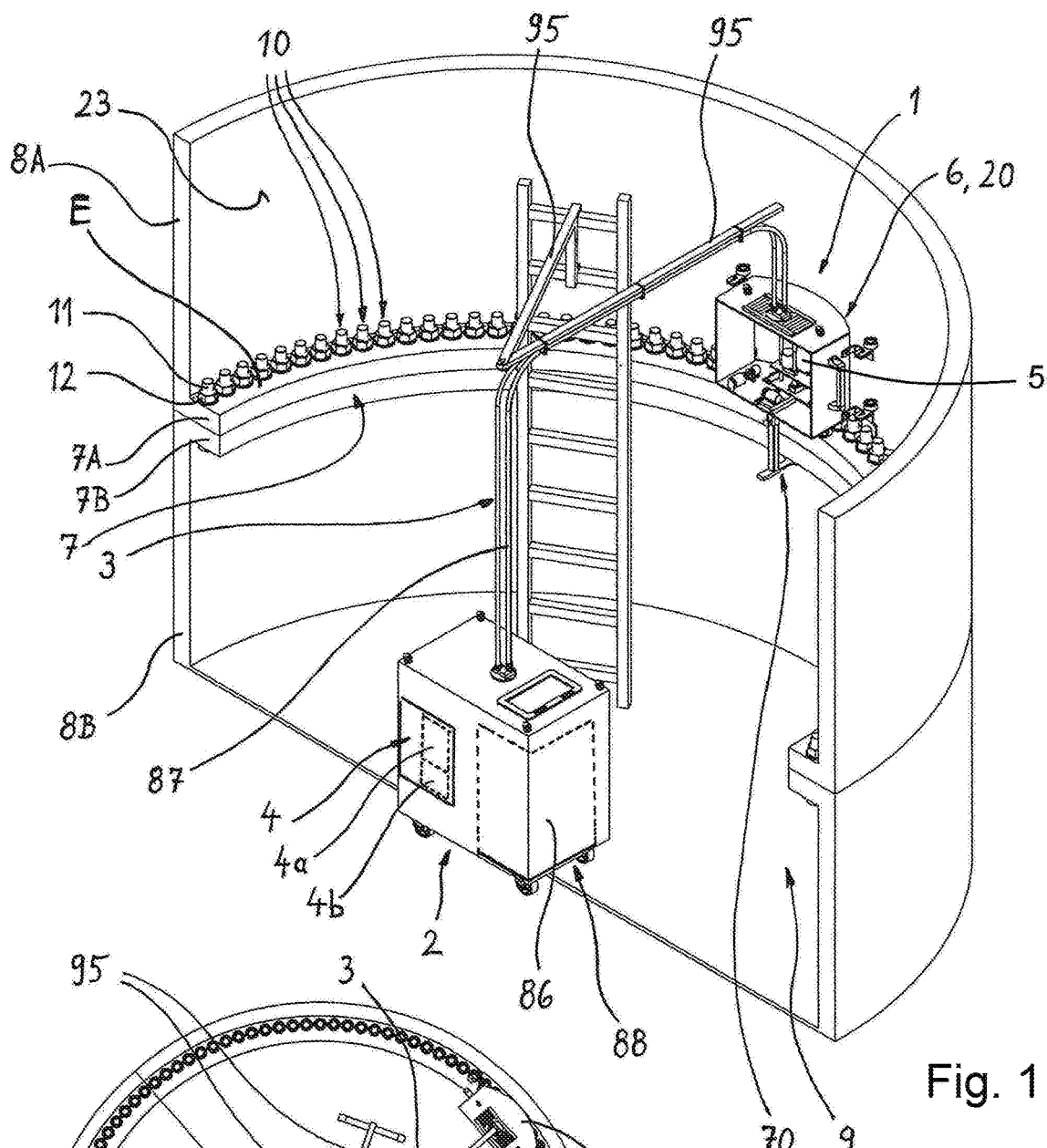
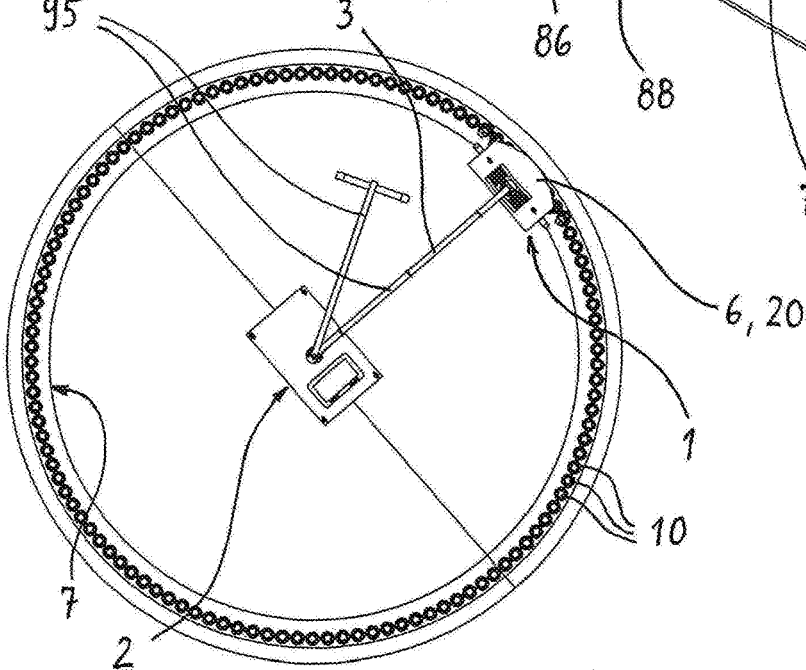

DEVICE FOR TIGHTENING SCREW CONNECTIONS

BACKGROUND OF THE INVENTION

The invention relates to a device for tightening screw connections which are arranged along a flange connection which surrounds, in ring-shaped form, a space and preferably the interior of the tower of a wind turbine, and of which each screw connection is made up of a threaded element and a nut screwed onto the threaded element, and the nut is supported against the flange connection, wherein the device has:
- a tool carrier which is movable along the flange connection and which is equipped with a preferably electric traction drive,
- a tool which is arranged on the tool carrier and which serves for tightening the screw connection and rotating the nut relative to the flange connection,
- a control unit which is designed to, by means of traction drive control signals, move the tool carrier into a working position in which the tool is situated opposite the screw connection that is respectively to be tightened, and to control the tightening of the screw connection and rotation of the nut by means of tool control signals.

A device having these features is known from EP 2 607 685 B1. Said device serves for tightening screw connections which are arranged in a row along a flange. Each screw connection is made up of a threaded element and of a nut, which is screwed thereon, wherein the nut is supported against the top side of the flange. The tightening of the screw connection and rotation of the nut relative to the flange is performed using a tool arranged on a self-propelled vehicle. In order to position the tool above the screw connection that is respectively to be tightened, the vehicle has a position sensor. On the basis of the position signals acquired by the sensor, the vehicle with the tool arranged thereon is moved in such a controlled fashion until it is determined from the signals that the tool is situated in axial alignment with the screw connection axis of the screw connection that is respectively to be tightened. For this purpose, the position signals of the position sensor are processed by control technology into signals for the drive of the vehicle. The controller is furthermore designed to control the tightening process.

The positioning of the vehicle with evaluation of the signals of the position sensor is complex from a control aspect owing to the required accuracy. Furthermore, a situation may arise in which the position sensor, if it is designed for example for sensing structures which project upward from the top side of the flange, can be confused by objects which are not a constituent part of the screw connections. Very good but thus also expensive sensor technology is thus required.

It is therefore the object of the invention to enable, by means of technical measures, carrying out the movement of the tool, which is movable by means of a controlled traction drive along the flange connection, into the next working position in a technically less cumbersome and nevertheless reliable manner.

SUMMARY OF THE INVENTION

To achieve this object for a device of the aforementioned kind, it is proposed according to the invention that the control unit comprises, for moving to the respective working position of the tool carrier, a travel control module with a travel controller which is designed to stop the traction drive after a predefined travel length, as target variable, has been reached. The travel controller, which is implemented as a module of the control unit, is configured to stop the traction drive, and thus interrupt the travel of the tool carrier, after a travel variable predefined in the control unit, as setpoint or target variable, is reached.

With such a device, it is possible for the respectively next working position to be reliably moved to even without evaluation of position signals of a position sensor. This is because such a sensor operates reliably only if it is capable of reliably detecting features or structures that are characteristic of the screw connection to be moved to. Achieving this in an error-free manner requires a high level of technical outlay in the sensing electronics used and in the conversion into travel signals. This type of position determination is also not always error-free, because structures not belonging to the screw connection can influence the sensor signal, with the risk that the screw connection that is to be tightened next not being reliably found.

The described device does not require this type of sensing. Instead, the invention utilizes the realization that, in the case of ring-shaped flange connections such as are typical for the screw connection of tower portions of a wind turbine, the positions of the screw connections are fixed at the design stage and are therefore known. Using the design data, it is thus possible with high accuracy to determine at least the relative arrangement of the screw connections with respect to one another. This is because the screw connections generally have a spacing, that is to say circumferential spacing, to one another which is always constant. Once the position of a first screw connection to be tightened has been reliably found, the positions of all of the other screw connections can be calculated on the basis of geometrical relationships, along with, in particular, the travel lengths, that is to say distances, to be covered in the circumferential direction of the flange.

The movement to the next screw connection, which may be either the adjacent screw connection or any other screw connection of the flange connection, is thus performed not on the basis of sensor control but rather using a vehicle control method with travel lengths or distances as target values. For this purpose, the control unit comprises a travel control module with internal travel distance presets, wherein the vehicle control method implemented in the travel control module is configured to stop the traction drive after the travel or distance preset as target variable has been attained, such that, at the working position reached at this point in time, the screw connection process can be initiated, which is likewise performed in a manner dependent on signals from the control unit.

Since the invention is based on a control method with travel control utilizing the known geometrical positions of the screw connection axes of all of the screw connections, it is possible in the travel control module to freely program the sequence in which the screw connections are tightened. This is because it is not always advantageous for the respectively adjacent screw connection to be tightened next. It may also be advantageous, after the tightening of one nut, for the nut of a screw connection situated oppositely in relation to the centre of the flange connection to be tightened next, and so forth.

Advantageous embodiments of the device are specified in the dependent claims.

With one refinement, provision is made whereby the tool carrier is, for the support thereof on the top side of the flange connection, equipped with rollers which are mounted on horizontal rotary axles on the tool carrier. The primary object of these rollers is to bear the weight of the tool carrier with the tool arranged thereon.

Furthermore, the tool carrier may, for the lateral support thereof, for example against the inner wall of the tower of the wind turbine, be equipped with additional rollers which are mounted on substantially vertical rotary axles on the tool carrier.

Preferably, the tool carrier is, for the lateral guidance thereof, equipped with rigidly attached alignment elements on which there is formed an alignment surface extending in a direction of travel, the surface normal of which alignment surface is opposite to the direction in which the tool carrier is supported by means of the additional rollers, that is to say by means of the rollers supported against the vertical inner wall. The alignment surfaces are situated in a plane in which they can be supported on the rear sides of the exposed threaded end portions of the screw connections. In this way, the alignment elements guide the carriage laterally and prevent the carriage from laterally departing from its intended travel line. With an action in the opposite direction, that is to say outward, corresponding alignment elements or alignment surfaces are not necessary. This is because the lateral guidance of the carriage in this direction is already achieved by means of the additional rollers.

The rollers, that is to say those rollers which are mounted on horizontal rotary axles and those rollers which are mounted on substantially vertical rotary axles, do not all need to be driven. An embodiment is rather preferred in which the rollers are only in part driven rollers, this applying for example in the case of only a single roller. The remaining rollers are then non-driven, concomitantly rotating rollers.

It is advantageous if a roller which bears a particularly large amount of weight is a driven roller. Therefore, with one refinement, it is proposed that each driven roller is one of those rollers which are mounted on horizontal rotary axles.

To simplify the centring of the tool in relation to the screw connection axis of the respective screw connection, a further refinement proposes a clutch, preferably an electromagnetic clutch, between the or each driven roller and a drive motor of the traction drive which drives the roller. If the clutch is separated or deactivated, these rollers of the vehicle are thus also freely rotatable, such that the vehicle can move freely and with low friction in a direction of travel, and the resulting play simplifies the centring of the tool on the screw connection axis of the respective screw connection.

With regard to the clutch, the control unit is preferably additionally designed to, by means of clutch switching signals, activate and/or deactivate the clutch.

In order to make the travel control particularly exact and verifiable, it is possible for at least one of the rollers to be, for the rotational angle coding thereof, coupled in slip-free fashion to an angle encoder. Said angle encoder detects the rotational angle of the roller, from which the exact travel distance covered by the roller can be calculated in the control unit in order to thus obtain exact values in the travel control for the movement to the next screw connection.

Since driven rollers often operate with a certain degree of slip, it is advantageous if the rotational-angle-coded roller is not a driven roller but rather one of the non-driven rollers.

The rotational-angle-coded roller is preferably one of the additional rollers which laterally support the tool carrier. The advantage of this refinement lies in the fact that, in the tower of a wind turbine, the inner walls are generally of relatively smooth-walled form, such that a roller running on the surface exhibits particularly exact and reproducible angular values.

If the angle encoder is not arranged on the same axle as that on which the roller is mounted on the vehicle, the angle encoder should be coupled by means of a chain, or a toothed belt which operates in a correspondingly slip-free manner, to the rotational-angle-coded roller. Furthermore, the angle encoder is also connected in terms of signal transmission to the travel control module of the control unit.

The tool carrier that forms the vehicle is preferably equipped with a vertical guide by means of which the tool is mounted in height-adjustable fashion on the tool carrier.

In order to improve the centring of the tool in relation to the screw connection axis of the respective screw connection, a further refinement provides a transverse guide with a guide direction transverse with respect to the longitudinal direction or direction of travel of the tool carrier. By means of the transverse guide, the vertical guide and/or the tool is mounted in horizontally displaceable fashion on the tool carrier. Preferably, the transverse guide is designed to exhibit particularly low friction and is equipped with a spring arrangement which acts on the vertical guide or the tool with a restoring force into a central position.

Also proposed is a documentation module which is preferably combined with the control unit in a common housing. In the documentation module, a data set is stored for each tightened screw connection. The data set comprises the individual identifier of the respective screw connection, wherein the identifier is detected by means of a barcode scan or an RFID tag at the respective screw connection, or the identifier is alternatively determined by the position of the respective screw connection on the flange connection, and/or the actually used tightening force of the tool, and/or the angle of rotation covered by the nut relative to the flange connection, and/or the measured change in length of the threaded element during the tightening process.

The tool used in the device may be, for example, an electrically or hydraulically driven screwdriver with a high drive torque. What is preferable, however, is a method for tightening the screw connections which operates in substantially torsion-free fashion. Such tightening is permitted if the tool is a screw-tensioning cylinder which operates axially in relation to the respective screw connection.

Such screw-tensioning cylinders are known. They commonly operate using hydraulic force, and are equipped with a cylinder housing, which surrounds a hydraulic working chamber, and with an exchangeable socket, which is arranged rotatably in the cylinder housing and which can be screwed together with a threaded end portion of the screw connection. A further constituent part of a screw-tensioning cylinder of the type is a rotary sleeve for driving, that is to say rotating, the nut in positive locking fashion while the threaded element of the screw connection is expanded slightly by the hydraulic pressure.

In the case of a screw-tensioning cylinder being used as a tool, this is equipped with an electric drive for rotating the exchangeable socket. Furthermore, the screw-tensioning cylinder may be equipped with a second electric drive. This is responsible for rotating the rotary sleeve and thus tightening the nut, and is additionally also designed for vertical adjustment of the screw-tensioning cylinder relative to the tool carrier.

Owing to the large number of screw connections and the required pressures of up to 300 bar, it is necessary, for the reliability of the auxiliary assemblies, for these to be designed to be correspondingly durable and stable, resulting in a high weight.

Therefore, for the exactness of the travel control, it is additionally advantageous if the auxiliary assemblies of the device, for example an energy module, are arranged not on the tool carrier but rather so as to be spatially separate therefrom. One refinement of the device is therefore characterized by a hydraulic line which leads from a hydraulic pump to the hydraulic working chamber of the screw-tensioning cylinder. The hydraulic pump is separate from the screw-tensioning cylinder and the vehicle on which the screw-tensioning cylinder is arranged, and the hydraulic pump is arranged in static fashion at one location and is a constituent part of an energy module.

According to a further embodiment of the device, the control unit is also arranged on the energy module, and is for example arranged together with the latter on a support. For the transmission of the traction drive control signals and of the tool control signals, an electrical signal line leads from the control unit to the tool carrier, wherein the signal line may be mechanically connected, at least over a part of its length, to the energy supply line.

Also proposed is a pivotable stand with one or more vertical pivot axes, wherein the stand is equipped with fastening means for the positionally fixed fastening thereof, and a longitudinal portion of the energy supply line is mounted into the stand.

The pivotable stand is preferably designed to support the energy supply line over an angle of rotation of at least approximately 360°.

The tool carrier preferably has a leadthrough for the energy supply line, wherein the leadthrough is situated on a slide which is arranged movably on the tool carrier, preferably in a direction of travel of the tool carrier.

BRIEF DESCRIPTION OF THE DRAWINGS

Further details and advantages will emerge from the following description of an exemplary embodiment illustrated in the drawing.

FIG. 1 shows a perspective view into two connected-together ring-shaped portions of the tower of a wind turbine, wherein only half of the portions is shown, over that length of the tower in which the portions are connected by means of a ring-shaped flange connection with a multiplicity of screw connections.

FIG. 2 shows a horizontal section, in this case with the full circumference of the ring-shaped tower portions illustrated.

DESCRIPTION OF PREFERRED EMBODIMENTS

Figure 3:
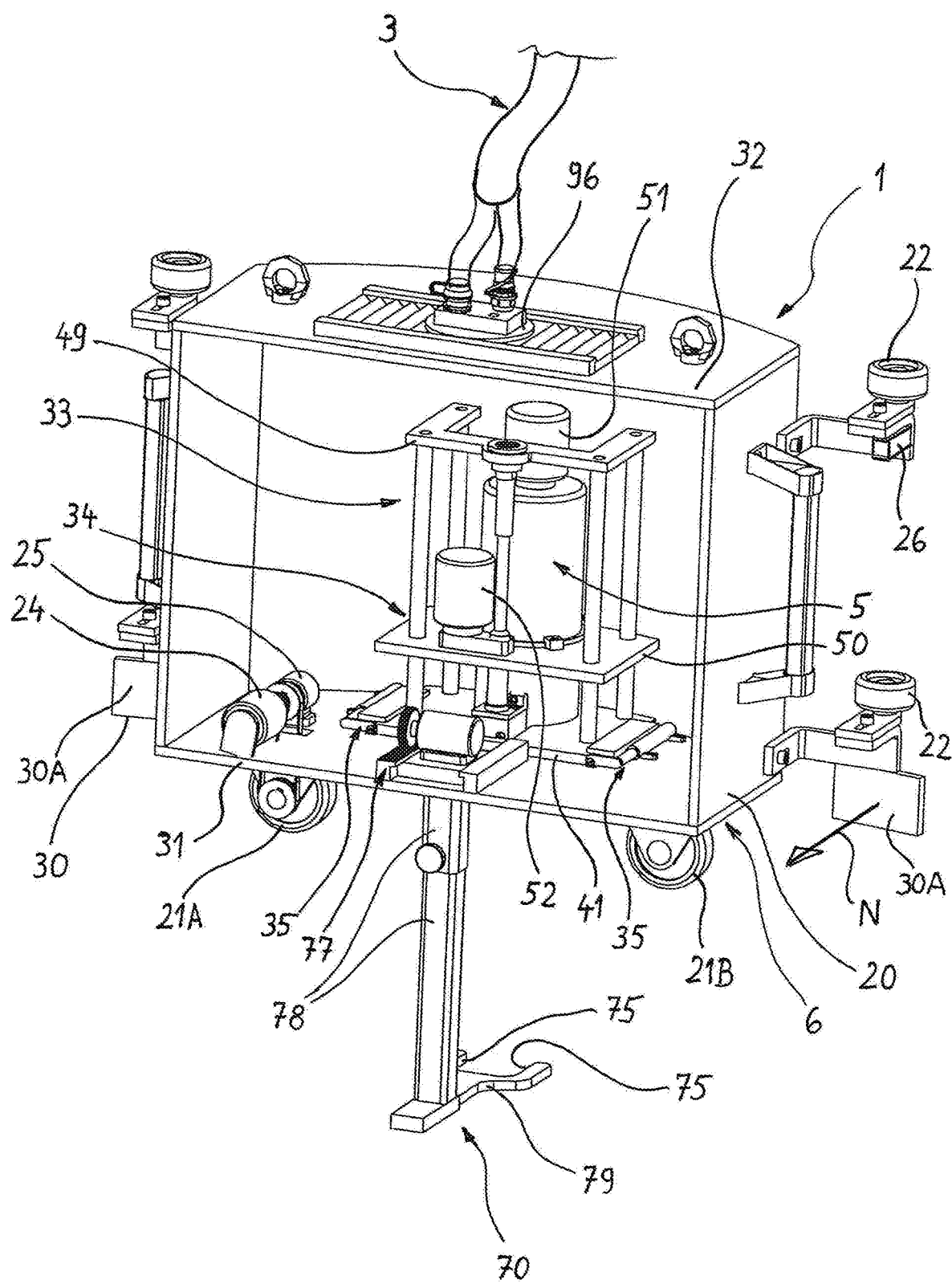
FIG. 3 shows a mobile unit, in the form of a carriage, of the device for tightening screw connections, in a perspective illustration.
Figure 4:
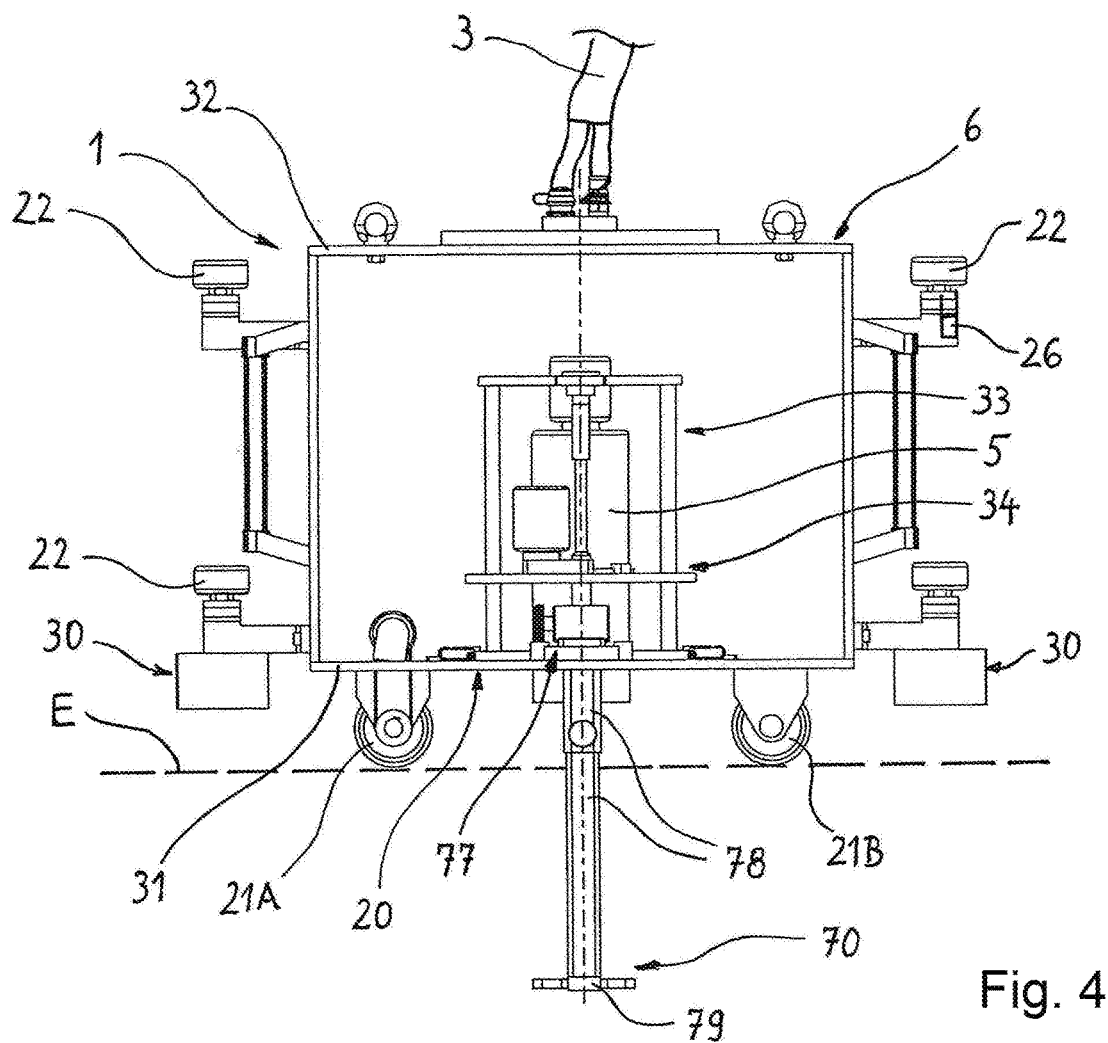
FIG. 4 shows a side view of the mobile unit.
Figure 5:
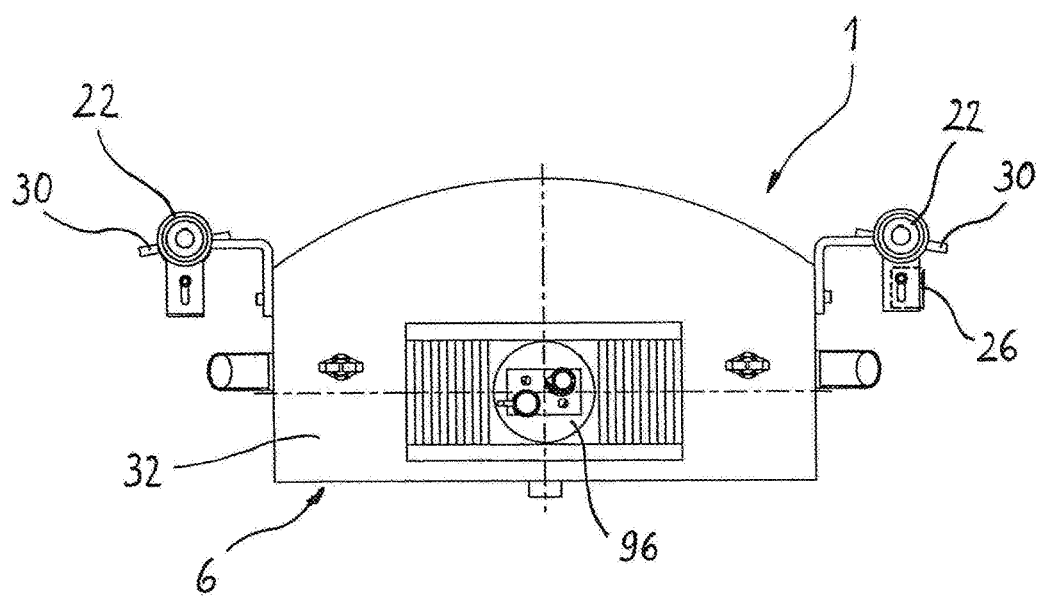
FIG. 5 shows the mobile unit in a plan view.
Figure 6:
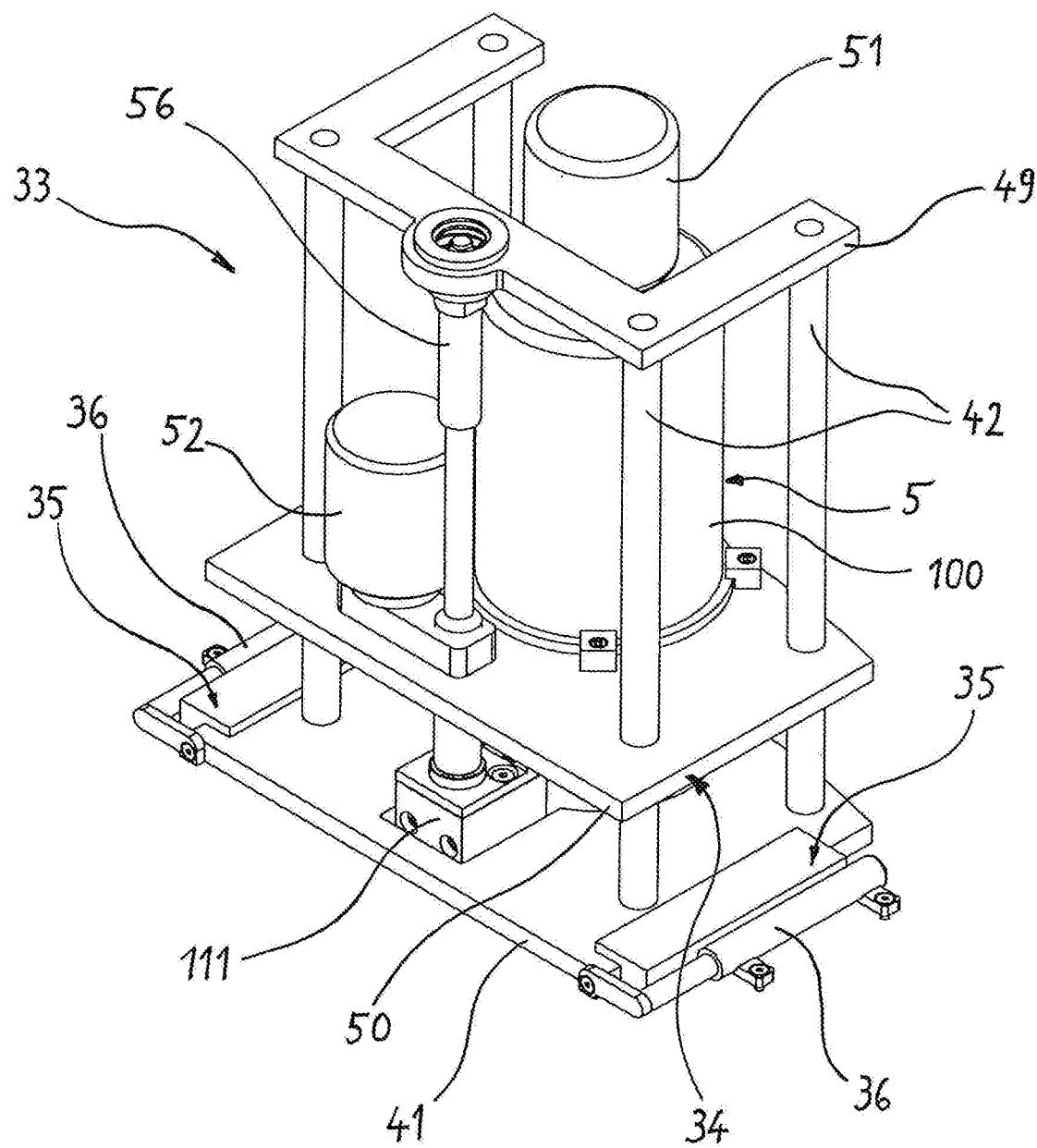
FIG. 6 shows, in a detail illustration, a stand arranged in the mobile unit, including a tool arranged in the stand.
Figure 7:
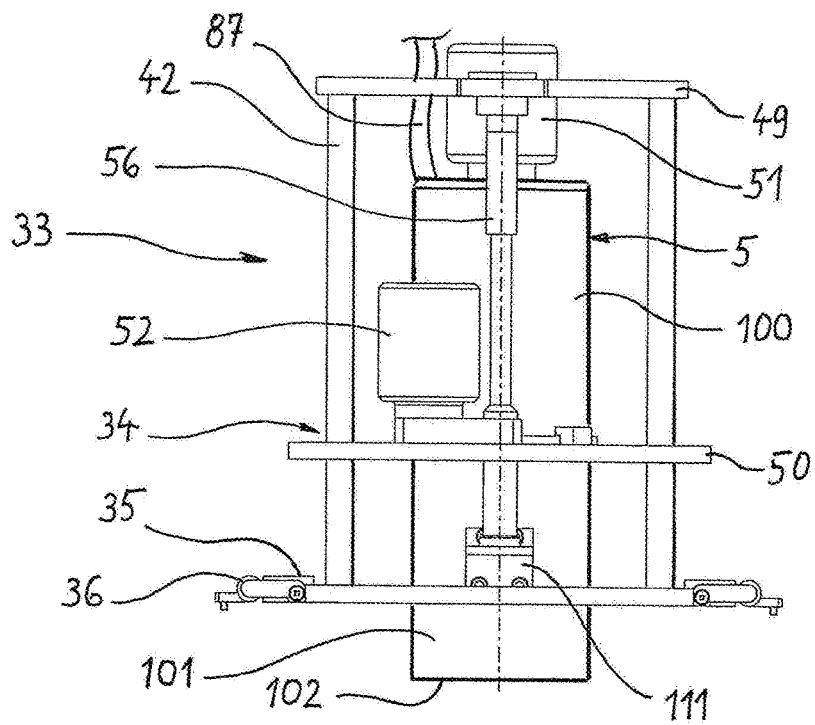
FIG. 7 shows the stand in an end view.

The device for tightening screw connections is made up of a mobile unit 1, of a spatially separately arranged static unit 2, and of a cable line, in particular a supply and signal cable 3, between the mobile unit 1 and the static unit 2. A constituent part of the mobile unit 1 is a tool 5 for tightening screw connections. In the exemplary embodiment described in more detail here, the tool is a hydraulically operated screw-tensioning cylinder 5. The energy supply of the device is situated in the static unit 2. A further constituent part of the static unit 2 is an electronic control unit 4, which in turn comprises inter alia a travel control module 4A and a documentation module 4B. In the documentation module 4B, a data set is stored for each individual tightened screw connection, which data set thus permits a later check of the most important characteristic data of the screw connection process.

The tool 5 is arranged in height-adjustable fashion on a carriage 6 which is movable by means of a drive. The carriage 6 is therefore the tool carrier of the device.

The carriage or tool carrier is, by means of rollers mounted thereon, configured for being moved along a ring-shaped flange connection 7, which is a constituent part of a tower-type wind turbine, into different circumferential positions in order, at each of these positions, to tighten, retighten or else release a screw connection situated there.

The flange connection 7 is in this case a double flange composed of an upper ring-shaped flange 7A and a lower ring-shaped flange 7B which lies preferably areally against the upper ring-shaped flange. The upper ring-shaped flange 7A is situated at the lower edge of an upper ring-shaped tower portion 8A. The lower ring-shaped flange 7B is situated at the upper edge of a lower tower portion 8B. The tower portions 8A, 8B form, together with further similar tower portions, the vertical tower of a wind turbine. Such wind turbines, with heights of up to 150 m, are composed of tower portions for assembly reasons. These tower portions are substantially cylindrical and enclose a circular space 9, which is surrounded by the flange connection 7. The tower portions may narrow conically in an upward direction.

The tower portions are screwed together by virtue of the ring-shaped flange 7A being formed on the in each case upper tower portion 8A and the ring-shaped flange 7B being formed on the tower portion 88B arranged in each case directly therebelow. The flange connection 7 which is composed of two ring-shaped flanges is held together by means of a multiplicity of screw connections. These are arranged so as to be distributed in each case at uniform intervals over the circumference.

Each screw connection 10 is composed of a bolt-like threaded element 11 and of a threaded nut 12 which is screwed onto the threaded portion of the threaded element 11.

The threaded nut 12 is supported with its bottom side on the preferably flat top side of the ring-shaped flange 7A.

In the exemplary embodiment, the threaded element 11 is formed so as to be supported in the manner of a screw with a radially widened collar or head from below against the lower ring-shaped flange 7B of the flange connection 7.

As is conventional in the case of screw connections, a washer may additionally be situated between the threaded nut 12 and the upper ring-shaped flange 7A.

The screw connections 10 are arranged so as to be distributed uniformly, that is to say at uniform intervals along the flange connection 7, around the space 9. The circumferential spacing of the screw-connection axis of one screw connection to the screw-connection axis of the immediately subsequent screw connection is thus always the same. Therefore, if the radius, in relation to the centre of the space 9, of the ring on which the axis of the screw connections 10 are situated is known, and the total number of screw connections is likewise known, the distances in the circumferential direction between the axes of the screw connections can be mathematically determined. These geometrical specifications are utilized to move the carriage 6 with the tool 5 arranged thereon along the extent of the flange 7 into individual working positions, wherein each working position is distinguished by the fact that the tool 5 is situated above and in alignment with the axis of the screw connection 10 that is respectively to be tightened.

The tool 5 used in the device may be a hydraulic torque driver, an electrical screwdriver or a screw-tensioning cylinder.

In this regard, the variant of the screw-tensioning cylinder will be described in more detail below on the basis of FIG. 10. Said screw-tensioning cylinder is distinguished, in particular during the retightening of screw connections, by the fact that a substantially torsion-free screw-tensioning process is achieved, that is to say without the occurrence of relatively high torsional forces over the screw length. For this purpose, the nut 12 is not directly rotated with a high tightening torque, the threaded element 11 rather being expanded in its longitudinal direction for example by means of hydraulic forces, whereby the underside of the nut 12 is moved clear of the ring-shaped flange 7A. In the thus expanded state, the nut 12 is retightened with a relatively low torque. Such a screw-tensioning cylinder 5 and such a screw-tensioning process with elongation of the threaded element 11 will be described in more detail further below.

All of the screw connections 10 extend with their screw-connection axes at right angles to the top side of the ring-shaped flange 7A and parallel to the central main axis of the tower portions 8A, 8B.

The main element of the mobile unit 1 is the tool carrier 20. In order that this can be moved along the flange connection into individual working positions, the tool carrier 20 is equipped with multiple rollers, which are in some cases driven, and thus propel the tool carrier 20, and which are in some cases not driven, that is to say merely roll conjointly during the movement.

In the exemplary embodiment shown here, two rollers 21A, 21B are provided, by means of which the tool carrier 20 is supported on the top side of the flange connection 7. The rollers 21A, 21B are mounted on horizontal rotary axles on the tool carrier 20. The roller 21A is a driven roller, whereas the roller 21B is a freely conjointly running roller. The rollers 21A, 21B bear the predominant part of the weight forces of the tool carrier 20 and of the assemblies arranged thereon, including those of the tool 5. Since the rollers 21A, 21B are subjected to a high weight loading, it is expedient for at least one of these rollers, in this case the roller 21A, to be the drive roller.

An electric drive motor 24 drives the roller 21A and, together with the latter, forms the traction drive of the device. The drive motor 24 of the traction drive is not seated on the same shaft as the driven roller 21A, a toothed belt or a chain rather converting the rotation of the drive motor 24 into identical, increased-speed or reduced-speed rotation of the drive roller 21A. It is however possible, if there is enough space available, for the drive motor 24 to be arranged on the same shaft as the roller 21A. The drive motor 24 of the traction drive receives traction drive control signals from the control unit 4.

A switchable clutch 25, preferably an electromagnetic clutch, is arranged in the drive path between drive motor 24 and roller 24A. The clutch 25 receives its clutch switching signals likewise from the electronic control unit 4. If the clutch 25 is separated or deactivated, the roller 24A is thus made freely rotatable, such that the tool carrier 20 can move freely in the direction of travel, and the play that is thus possible simplifies the centring of the tool 5 relative to the screw-connection axis of the respective screw connection 10.

Rollers 22 are also mounted on the tool carrier 20, but these are mounted on substantially vertical rotary axles. These additional rollers support the carriage against the inner wall 23 of the tower portion. The rollers 22 are subjected to only low weight loading compared with the rollers 21A, 21B. Nevertheless, they are supported against the inner wall 23, which is achieved by means of an arrangement of the rollers 21A, 21B in which the centre of gravity of the carriage is situated further to the outside than the rolling line of the rollers 21A, 21B.

The additional rollers 22 are not driven, that is to say merely rotate conjointly. It is preferable for at least one of the rollers 22 to be coupled in slip-free fashion to an angular encoder 26. The angular encoder 26 permits the detection of angular signals of the roller. From the angular signals, the processor of the electronic control unit 4 calculates the travelling distance of the tool carrier 20 along the inner wall 23. From this, in turn, it is possible, by means of the processor, to mathematically determine and check the distances that the tool carrier 20 covers or has covered along the ring on which the screw connections 10 are arranged.

For the lateral guidance of the carriage 6, an alignment element 30, which is preferably provided twofold, is fastened to the tool carrier 20 at the bottom. The alignment element 30 is equipped with an alignment surface 30A which extends in the direction of travel and the surface normal of which points inward and therefore oppositely to the direction in which the tool carrier is supported by means of the additional rollers 22. The alignment surfaces 30A are arranged on the carriage 6 at such a height that, during operation, they are situated at the height of the threaded end portions 11A of the threaded elements 11 and above the nut 12. Said alignment surfaces are furthermore situated slightly to the outside of the threaded end portions 11A on which they can be supported. This has the result, during the travelling movement of the carriage 6, that the carriage is supported on the rear side of the threaded end portions 11A, such that the carriage 6 cannot inwardly depart from the running line predefined by the rollers 21A, 21B. In the other direction, that is to say in the outward direction, the additional rollers 22 already perform the required lateral guidance of the carriage.

Constituent parts of the driven tool carrier 20 are a lower platform 31 and an upper platform 32 which is arranged fixedly relative to the lower platform 31. The rollers 21A, 21B are supported below the lower platform 31. For easy lifting and transportation of the carriage 6 as a whole, eyelets are fastened to the upper platform 32, into which eyelets a crane hook can be engaged.

A stand 33 which holds the tool 5 is supported on a surface on the top side of the lower platform 31. The stand 33 is formed as a vertical guide 34 for the height adjustment of the tool 5.

On the top side of the platform 31, on the one hand, and on the base of the stand 33, on the other hand, there are provided elements of a transverse guide 35 with a guide direction transverse with respect to the longitudinal direction and thus the direction of travel of the tool carrier 20. By means of the transverse guide 35, which operates with low friction, the stand 33 and thus the tool 5 arranged therein is mounted displaceably on the platform 31, specifically so as to be displaceable transversely with respect to the direction of travel of the tool carrier.

The sliding action of the stand 33 relative to the platform 31 may be supplemented by a spring arrangement 36 which, in the absence of transverse forces, holds the stand 33 in a central position in relation to the platform 31. Thus, when no transverse forces act on the tool 5 and on the stand 33, the stand, guided by the transverse guide 35 and under the force of the spring arrangement 36, automatically returns into the central position.

The stand 33 simultaneously forms a vertical guide 34 for the height adjustment of the tool 5. For this purpose, the stand is made up of the stand base 41, which lies displaceably on the platform 31 and which is guided in the transverse guide 35, of vertical guide rods 42 which are fastened rigidly to the stand base, of an upper stand frame 49 which connects the upper ends of the rods, and of a stand frame 50 which is adjustable in height by motor drive. The stand frame 50, which is movable up and down, is guided by the guide rods 42 of the vertical guide 34. The tool 5 is fixed to the stand frame 50.

For the tensioning process itself, the tool 5 duly operates hydraulically. For automatic tool operation, however, at least two electric drives 51, 52 are also provided. The two drives 51, 52 operate in a manner dependent on tool control signals from the control unit. The first electric drive 51 drives an exchangeable socket which is arranged rotatably in the screw-tensioning cylinder. Said first electric drive is situated preferably at the top on the cylinder housing of the screw-tensioning cylinder. The second electric drive 52 is arranged lower down and preferably on the height-adjustable stand frame 50.

The second electric drive 52 drives a rotary sleeve by means of which the threaded nut 12 can be set in rotation by means of a positively locking action. The second drive 52 may additionally be designed to raise and lower the stand frame 50 and thus the tool 5 relative to the stand 33, which in the exemplary embodiment is realized by means of a screw drive 56 arranged parallel to the guide rods 42, to which screw drive the drive shaft of the second drive 52 can be coupled.

The second drive 52 therefore has two functions. In a manner dependent on corresponding tool control signals from the control unit, the second drive can be coupled either to the rotary sleeve or to the screw drive 56.

During the tightening, retightening or else loosening of the screw connections 10, it is possible in principle for a situation to arise in which the threaded elements 11 conjointly rotate in an undesired manner. To prevent this during the tensioning process, on the tool carrier 20, there is arranged not only the tightening tool but also a holding tool 70 which serves as counter-holder. A constituent part of the holding tool 70 is at least one counter-holding surface 75 which can be supported against a surface on the radially widened portion of the threaded element 11, for example against the surface of a hexagon with which the threaded element 11 is equipped below the flange connection 7. The positive locking that is thus realized prevents the conjoint rotation of the threaded element 11 during the tightening, retightening or loosening of the screw connection 10.

In order to bring the counter-holding surface 75 into engagement with the surface on the radially widened portion of the threaded element 11, an electric drive 77 is arranged on the lower platform 31 for the purposes of moving the holding tool 70 back and forth between a passive position and an active position, the counter-holding position. It is only in the active position that the counter-holding surface 75 abuts against the corresponding surface and in particular hexagonal surface of the threaded element 11. The processor of the control unit 4 is configured to control the electric drive 77 by means of holding tool control signals.

In the embodiment illustrated, the tool portion 79 of the holding tool 70 is configured in the manner of an open-ended spanner with two mutually parallel counter-holding surfaces 75 arranged opposite one another.

Here, the drive 77 of the holding tool 70 operates transversely with respect to the axis of the screw connections. The drive 77 for moving the holding tool 70 back and forth is, in the embodiment described here, in the form of a toothed-rack drive. Alternatively, it is possible, in a manner not illustrated in the drawing, for the drive of the holding tool to operate parallel to the axis of the screw connection 10, that is to say vertically.

The holding tool 70 comprises a tool main body 78, which is connected at a drive side to the drive 77, and the tool portion 79, with the counter-holding surfaces 75 formed thereon. The tool portion 79 is guided on the tool main body 78 so as to be movable counter to the force of a spring 80. Therefore, if the holding tool 70 is moved against the threaded element 11, the spring 80 holds the tool portion 79 back until the parts have assumed the rotational position relative to one another which permits the positive locking action. This is because, as a result of a relative rotation of the parts involved, at some point in time a rotational position is reached in which the counter-holding surfaces 75 can latch securely and in positively locking fashion under spring pressure and, in so doing, enter into engagement.

When the tool portion 79 is not under load, that is to say in the absence of abutment or positive locking on the threaded element, the tool portion 79 is supported, under the force of the spring 80, against a stop 81 which is situated on the tool main body 78.

Since the rollers 21A, 21B define a standing plane E of the carriage or of the tool carrier 20, the drive 77 of the holding tool 70 is situated above the standing plane E, wherein the drive is preferably fastened to the platform 31. From there, the tool main body 78 extends down beyond the standing plane E to the tool portion 79. Said tool portion is situated at a level below the flange connection 7.

The length of the tool main body 78 and thus the basic position of the tool portion 79 can be manually set. The position thus set is secured by means of a clamping screw.

The drive 77 of the holding tool 70 is also controlled by means of control signals from the control unit 4, specifically by means of holding tool control signals. The control is such that the holding tool 70 is moved from its rest position into its active position at the earliest when the tool carrier 20 has assumed a working position in which the axis of the tool 5 is aligned with the axis of the respective threaded element 11.

During the practical operation of the device, the static unit 2 is positioned spatially separately from the mobile unit 1, that is to say the carriage, at a suitable location within the space 9. This location may for example be an intermediate floor or may be a fixedly installed ladder for service personnel, which ladder connects individual levels of the tower. It is however preferable for the static unit 2 to be arranged as far as possible centrally within the space 9. It is therefore necessary to connect the assemblies and devices of the static unit 2 to the carriage 6 by means of the suitable supply and signal cable 3. The static unit 2 includes, for example, an energy module 88 or energy modules for the supply of energy to the traction drive, to the tool 5 including all of its functions, and to the holding tool 70.

The control unit 4 is also a constituent part of the static unit 2. The control unit 4 is designed inter alia to, by means of traction drive control signals, move the tool carrier 20 in the longitudinal direction of the tool carrier 20 into a working position in which the tool 5 is situated opposite the screw connection that is respectively to be tightened, and, by means of tool control signals, perform the tightening of the screw connection and rotation of the nut.

The control unit 4 is preferably arranged on the energy module 88 or arranged together with the latter on a support. In the embodiment as per FIGS. 1 and 2, the static unit 2 is combined to form a box. Rollers under the box and handles on the box make it easier for the box to be handled during transport.

For the supply of energy, energy supply lines lead from the energy module 88 to the tool carrier 20. These include, for example, electrical cables for the supply of electricity to the various electric drives of the tool carrier 20, of the tool 5 and of the holding tool 70. An electrical current distributor may also be a constituent part of the energy module 88.

The supply cables furthermore include a hydraulic line 87 for the supply to the hydraulically driven tool 5. The associated hydraulic pump 86 is also a constituent part of the static unit 2.

For the transmission of the traction drive control signals, of the tool control signals, of the holding tool control signals and of the clutch switching signals, there is furthermore at least one signal line between the control unit 4 and the tool carrier 20. The signal connection may however also be cable-free or wireless.

Said lines, which are combined as a supply and signal cable 3, between the static unit 2 and the carriage 6 are, where possible and at least over a part of their length, led in parallel and in mechanically connected-together fashion.

For the guidance of the cable 3, a constituent part of the device is a pivot stand 95, which is installed as far as possible centrally in the space 9, with one or more vertical pivot axes. The pivot stand 95 is, for the fastening thereof within the space 9, equipped with fastening means, for example brackets that can be screwed on. The supply and signal cable 3 is mounted into the pivot stand 95. Said pivot stand is designed to support the cable 3 within the space 9 over a rotational angle of at least approximately 360°, such that the cable 3 can follow the movement of the carriage 6 over the entire circumference of the flange.

In order that fixtures and obstructions in the space 9 do not impede the movement of the cable 3 over the full 360°, a facility is provided on the tool carrier 20 for that portion of the supply and signal cable 3 which ends there to be displaced relative to the tool carrier 20 in the direction of travel. For this purpose, the tool carrier 20 is equipped, on its upper platform 32, with a slide 96 which is movable in the direction of travel of the tool carrier 20. The slide 96 is equipped with an opening through which the cable 3 passes into the interior of the carriage or tool carrier 20. The slide 96 with the opening is freely movable such that, depending on the position of the slide, the cable 3 leads into the interior of the carriage further towards the front or further towards the rear.

Figure 10:
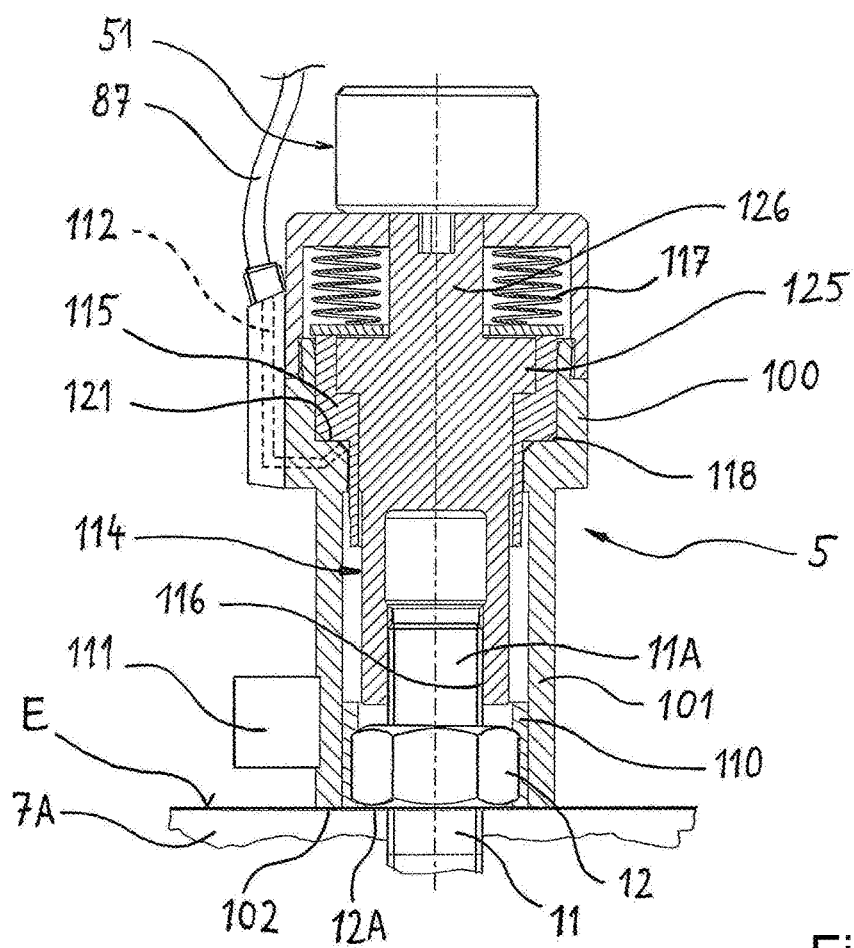
FIG. 10 shows, in a partial section, a hydraulic tool for tightening screw connections, wherein the tool is illustrated in a position in which it has been lowered to and set down onto the top side of the flange connection.
Figure 8:
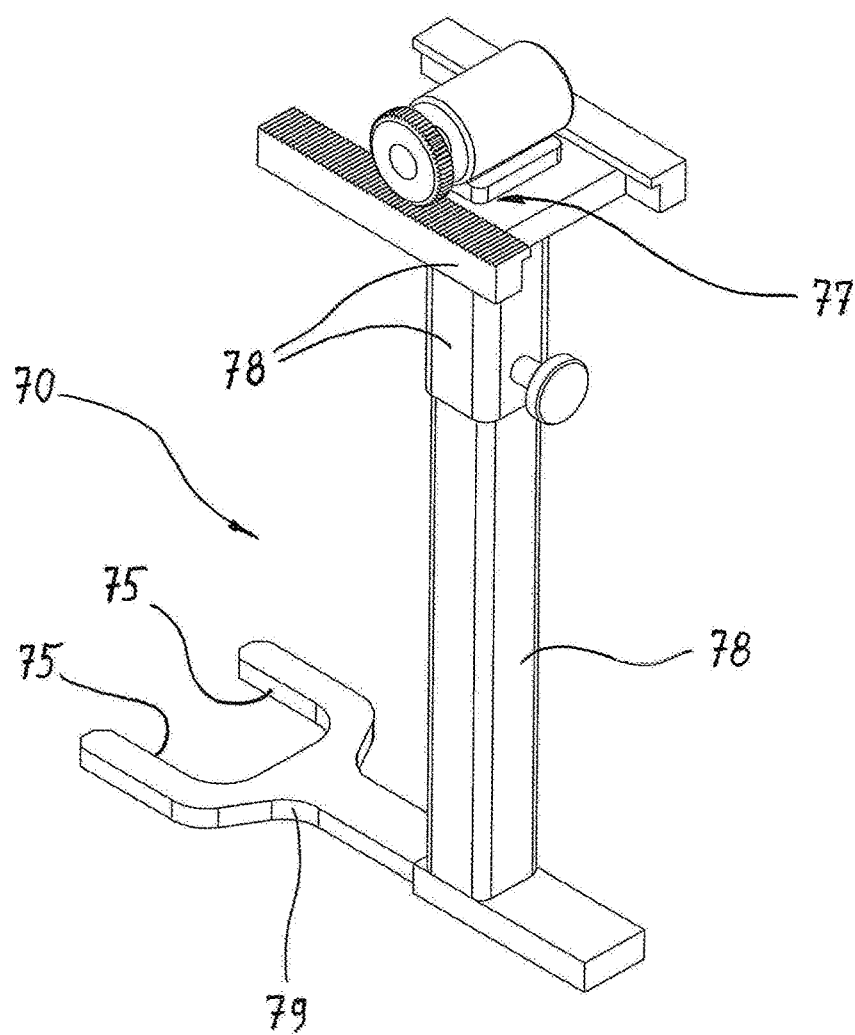
FIG. 8 shows, in a detail illustration, a holding tool, at the lower end of which there is arranged a tool for the counter-holding action during the tightening of the screw connection.
Figure 9:
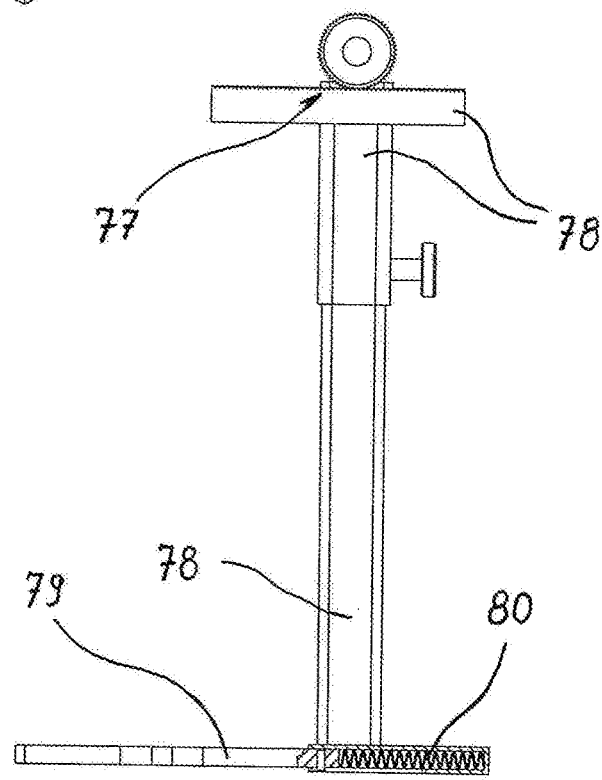
FIG. 9 shows the holding tool in a view.

FIG. 10 shows the hydraulically operated screw-tensioning cylinder 5, which forms the tool in this case and which serves for the tightening, in particular retightening, and possibly also the loosening, of the screw connections 10 shown in FIGS. 1 and 2. The screw-tensioning cylinder is illustrated in its operating position before the application of hydraulic pressure. In this position, the screw-tensioning cylinder has been lowered to such an extent that it is supported with its bottom side 102 on the ring-shaped flange 7A.

With the screw-tensioning cylinder 5, a predefined preload force can be applied to the threaded element 11 in the bolt longitudinal direction, whereby the threaded element 11 expands slightly in order, in this state, for the threaded nut 12 of the screw connection to be tightened or retightened.

An exchangeable socket 114 arranged rotatably in a cylinder housing 100 of the screw-tensioning cylinder 5 is equipped, at one end thereof, with an internal thread 116. By means of this thread, the exchangeable socket 114 is, before the start of the tensioning process, screwed by rotation of the exchangeable socket 114 onto that free threaded end portion 11A of the threaded element 11 which projects upward beyond the nut 12. This screwing-on of the exchangeable socket 114 is also associated with a corresponding lowering of the screw-tensioning cylinder 5 as a whole, until the bottom side 102 comes to lie on the ring-shaped flange 7A, because the exchangeable socket has no or only little longitudinal play relative to the cylinder housing 100.

Subsequently, the exchangeable socket 114 that has thus been screwed together with the threaded element 11 is hydraulically placed under tension, whereby the screw connection expands in a longitudinal direction. The contact surface 12A of the threaded nut 12 thus moves clear, such that the threaded nut 12 can then be rotated with only little rotational resistance and, in this way, tightened or retightened against the underlying surface, that is to say against the ring-shaped flange 7A and possibly against a washer.

The hydraulic tensioning mechanism is situated in the pressure-tight cylinder housing 100. This may also be assembled in modular fashion from multiple cylinder portions. The rigid continuation of the cylinder housing 100 is a support tube 101. This itself is either part of the cylinder housing 100, as illustrated, or a separate component. The support tube 101 is open towards the screw connection, surrounds the threaded nut 12, and is supported with the bottom side 102 against the top side of the ring-shaped flange 7A. Said top side therefore forms the counterbearing during the tightening process. The tightening process is performed by virtue of the exchangeable socket 114 pulling on the threaded end portion 11A, wherein, for the retightening of the nut 12, the latter is screwed downward until it comes to bear with its contact surface 12A firmly against the flange 7A again.

The support tube 101 is equipped with at least one opening which is of such a size that the nut 12 can be rotated, and thus retightened, through the opening. This is self-evidently possible only if the tensioning device is operating at the same time, and therefore the nut 12 is not subjected to considerable friction loading. The rotation of the threaded nut 12 is performed by means of a rotary sleeve 110 which surrounds the nut. The rotary sleeve 110 is driven by a gearing 111, which is attached laterally to the support tube 101 and which operates through the opening thereof.

The cylinder housing 100 is equipped with a hydraulic port 112 via which a hydraulic working chamber 118 in the interior of the tool is connected via the flexible but pressure-tight hydraulic line 87 to a hydraulic pump 86 (FIG. 1). The hydraulic pump 86 is a constituent part of the static unit 2.

Via the hydraulic port 112, highly pressurized hydraulic fluid passes into the working chamber 118, whereby a piston 115 which is mounted in longitudinally movable fashion in the cylinder housing 100 can be acted on with hydraulic pressure. As a result of the build-up of hydraulic force in the hydraulic working chamber 118, the piston 115 is pushed upward. This is performed counter to the force of a spring 117 which acts on the piston 115. The spring 117 serves as a piston restoring spring and directly subjects the piston 115 to a force which seeks to hold the piston in its basic position, in which the hydraulic working chamber 118 has its smallest volume.

The piston 115 surrounds the exchangeable socket 114 in the ring-shaped form. The piston 115 is equipped, at its inner edge, with an encircling step which forms a driver surface 121 on which the exchangeable socket 114 is supported by way of a radially widened portion 125. The exchangeable socket 114 can thus be driven by the piston 115. In the absence of pressure loading, the exchangeable socket 114 is freely rotatable relative to the piston 115 and relative to the cylinder housing 100.

The exchangeable socket 114 is, like the piston 115, situated centrally on the longitudinal axis of the cylinder housing 100, and is made up of a portion with the internal thread 116, which is screwed onto the threaded end portion 11A of the threaded element 11, of the radially widened portion 125, and of a drive portion 126, in the stated sequence. The drive portion 126 is situated on that end of the exchangeable socket 114 which is averted from the threaded element 11.

The drive portion 126 is engaged on by the shaft of the electric drive 51, which is operated in a manner dependent on tool control signals from the control unit, in order to rotate the exchangeable socket 114 and either screw this onto the threaded end portion 11A before the tensioning process, with the entire cylinder housing 100 being lowered, or to unscrew the exchangeable socket from the threaded end portion 11A after the tensioning process, with the entire cylinder housing 100 being raised.

If a more extensive height adjustment, that is to say a height adjustment that cannot be realized merely by means of the rotation of the exchangeable socket 114, of the cylinder housing 100 is required before and after the tensioning process, this additional height adjustment is performed by means of the electrically driven vertical guide 34. This, too, operates in a manner dependent on control signals, specifically tool control signals, from the control unit 4.

Only when the exchangeable socket 114 has been screwed onto the threaded end portion 11A is the hydraulic tensioning process started by means of the control unit 4 by virtue of the hydraulic pump 86 building up hydraulic pressure on the basis of hydraulics control signals from the control unit 4.

The controlled, motor-driven screwing-on and unscrewing of the exchangeable socket 114 is also performed in a manner dependent on tool control signals from the control unit 4.

Figure 11:
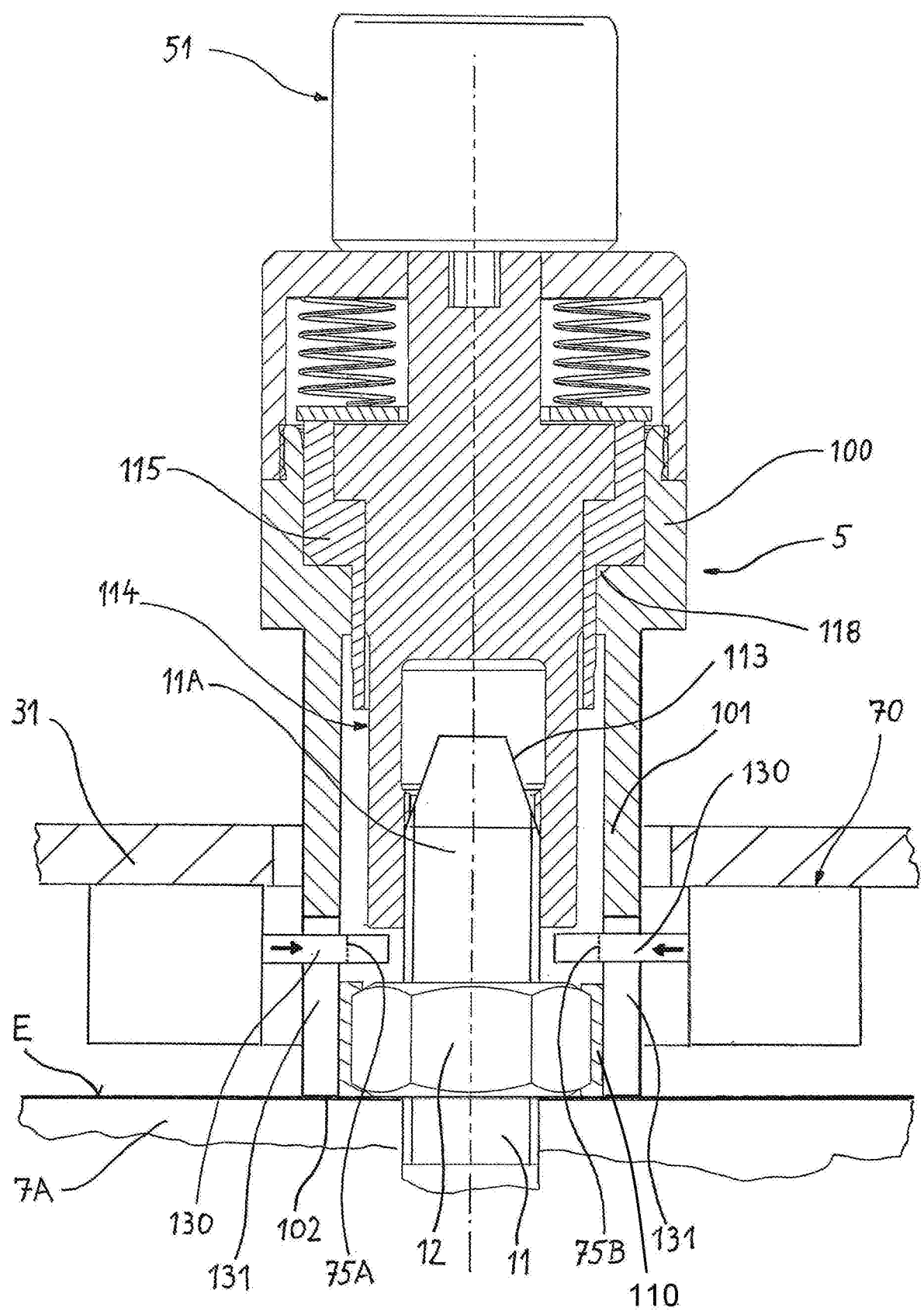
FIG. 11 shows the lower part of the hydraulic tool in an embodiment in which the holding tool is combined with the tool.

FIG. 11 shows an embodiment in which the holding tool 70, which imparts a securing action for preventing conjoint rotation, and the tool 5 are arranged in combined fashion on the carriage or the tool carrier.

The holding tool 70 is fastened to the tool carrier 20, in this case to the lower platform 31 thereof, and comprises two clamping jaws 130 which are movable toward one another in alignment with the screw-connection axis. The ends of the clamping jaws are formed here by the counter-holding surfaces 75A, 75B, and are for this purpose designed as shells. The radius of the shells is substantially equal to the radius of the threaded portion 11A of the threaded element 11.

The two clamping jaws 130 are driven electrically, wherein, again, the control unit 4 (FIG. 1) is configured to control this driving action by means of the holding tool control signals. In order that, in this embodiment, the counter-holding surfaces 75A, 75B press directly onto the threaded portion, the drive of the holding tool 70 must generate relatively high pressure forces. In order, here, to additionally increase the friction resistance, the counter-holding surfaces 75A, 75B may have a suitable friction lining, for example rubber, or a suitable non-smooth surface. For example, the surface may be adapted in terms of its structure to the outer structure of the thread such that substantial blocking for preventing conjoint rotation is realized.

The clamping jaws 130 of the holding tool 70 extend through openings 131 in the tool 5, wherein the counter-holding surfaces 75A, 75B are situated within the tool 5. The clamping jaws 130 are guided in the holding tool 70, which is mounted fixedly on the tool carrier, such that the clamping jaws are movable, by means of the drive, exclusively in their clamping direction.

The openings 131 are situated in the support tube 101 of the tool 5. They extend continuously to the bottom side 102 of the support tube 101. It is thus ensured that the tool 5, when it is lowered for the tensioning process, is not impeded by the components of the holding tool 70. The tool 5 and the holding tool 70 are duly structurally combined, but their functions are separate from one another.

The embodiment of FIG. 11 makes use of the fact that, in practice, there is often still a thread longitudinal portion of approximately 5 mm available between the top side of the nut 12 and that threaded end portion 11A which is surrounded by the exchangeable socket 114. This thread longitudinal portion is sufficient for the conjoint rotation of the threaded element 11 to be prevented by means of the clamping jaws 130 which are moved together there.

In the embodiment as per FIG. 11, too, the control unit 4 (FIG. 1) may be configured to, by means of traction drive control signals, move the tool carrier 20 including the screw-tensioning cylinder 5 into a working position in which the screw-tensioning cylinder 5 is situated opposite the screw connection that is respectively to be tightened, and, by means of tool control signals, control the axial tightening of the screw connection and the rotation of the nut 12. The control unit 4 (FIG. 1) is additionally designed to, by means of holding tool control signals, control the drive of the holding tool 70.

Figure 12:
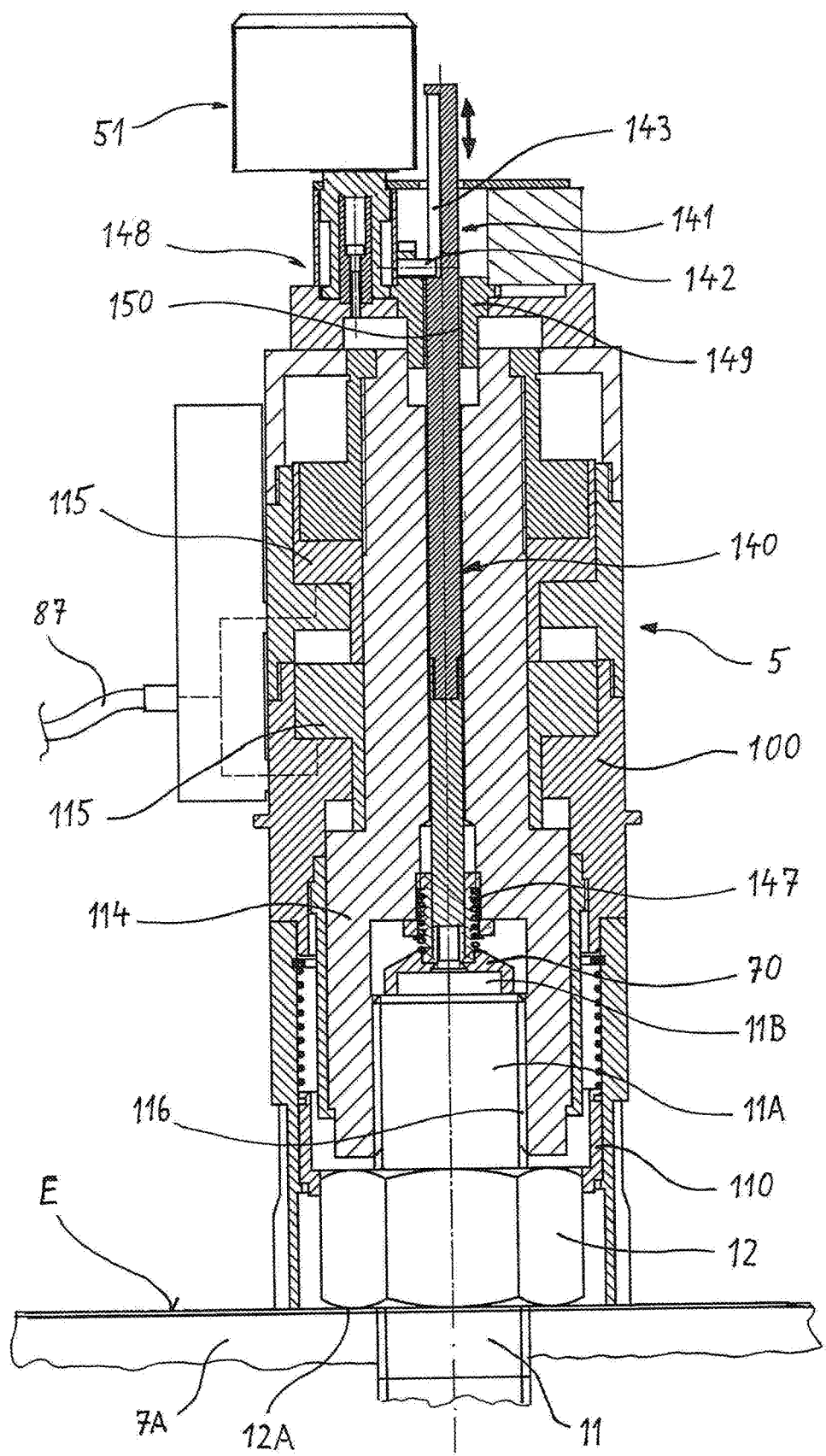
FIG. 12 shows the hydraulic tool in yet another embodiment, in which the holding tool is arranged in the centre of the hydraulic tool.

FIG. 12 shows a further embodiment. In this, the holding tool 70, which imparts a securing action for preventing conjoint rotation, is arranged centrally in the tool 5 formed as screw-tensioning cylinder. The screw-tensioning cylinder itself corresponds in terms of its basic construction to the embodiment as per FIG. 10 or FIG. 11. This applies to the cylinder housing 100, to the piston guided therein, which is however in this case a double piston 115, to the exchangeable socket 114 which is rotatable in the cylinder housing, and to the rotary sleeve 110 which is arranged rotatably in the cylinder housing and which serves for rotating the nut 12.

In FIG. 12, on the longitudinal axis of the exchangeable socket 114, there is arranged a rod 140, for which purpose the exchangeable socket 114 is equipped with a corresponding longitudinal bore. The single-part or multi-part rod 140 is equipped, at its lower end in FIG. 12, with the holding tool 70, and is equipped, in the region of its upper end in FIG. 12, with a rotation-preventing securing means 141. The rotation-preventing securing means 141 holds the rod 140 rotationally fixed relative to the cylinder housing 100. In the exemplary embodiment, this is achieved by virtue of a bolt 142 which is fixed with respect to the housing engaging into a longitudinal groove 143 in the rod 140. The longitudinal groove 143 extends axially only over a part of the length of the rod 140.

The embodiment of FIG. 12 is suitable for screw connections in the case of which the threaded element 11 is additionally equipped, on the face side of its threaded end portion 11A, with a polygon 11B. The polygon 11B is in this case an axially projecting square, though may also be for example a hexagon or a square socket or hexagonal socket formed in recessed fashion in the threaded end portion 11A.

The holding tool 70 is designed as a corresponding polygon, that is to say in this case as a square socket, which can be coupled to the polygon 11B by positive locking. To form the holding tool 70, the lower end of the rod 140 is correspondingly enlarged.

The holding tool 70 is supported axially, and under permanent spring force, against the polygon 11B. The spring force is imparted by a spring element 147, which is supported at one side against the holding tool 70 or the rod 140 and at the other side against the exchangeable socket 114. The spring element 147 serves to provide a permanent axial preload force of the holding tool 70, such that a secure engagement of the holding tool 70 on the polygon 11B occurs already after a short relative rotation. The axial clearance required for this purpose is ensured by the length of the longitudinal groove 143.

A further constituent part of the tool 5 in FIG. 12 is the drive 51 for rotating the exchangeable socket 114. The drive is however realized not centrally on the longitudinal axis, because the rod 140 is situated there. The drive 51 is rather situated with a lateral offset, wherein a gearing 148 is provided in the drive path between drive 51 and exchangeable socket 114. A constituent part of the gearing 148 is a toothed gear 149 which is rotationally conjoint with respect to the exchangeable socket 114. The toothed gear 149 has a passage opening 150 through which the rod 140 extends in freely rotatable fashion.

It is also the case in the embodiment as per FIG. 12 that the control unit 4 (FIG. 1) may be configured to, by means of traction drive control signals, move the tool carrier 20 including the screw-tensioning cylinder 5 into a working position in which the screw-tensioning cylinder 5 is situated opposite the screw connection that is respectively to be tightened. Furthermore, the control unit 4 may be configured to, by means of tool control signals, control the axial tightening of the screw connection and the rotation of the nut 12.

Furthermore, it is also the case in the embodiment as per FIG. 12 that the control unit 4 (FIG. 1) may be configured to, by means of holding tool control signals and a corresponding drive, control the holding tool 70 by virtue of the rod 140 with the holding tool 70 arranged rigidly thereon being lowered in controlled fashion onto the screw connection, and raised again in controlled fashion, by means of the drive. The function of the controlled lowering and raising of the holding tool may however also be performed by the spring element 147.

The specification incorporates by reference the entire disclosure of German priority document 10 2018 107 653.3 having a filing date of 29 Mar. 2018.

While specific embodiments of the invention have been shown and described in detail to illustrate the inventive principles, it will be understood that the invention may be embodied otherwise without departing from such principles.

LIST OF REFERENCE CHARACTERS

1 Mobile unit
2 Static unit
3 Cable, supply and signal cable
4 Control unit
4A Travel control module
4B Documentation module
5 Tool, screw-tensioning cylinder
6 Carriage
7 Flange connection
7A Ring-shaped flange
7B Ring-shaped flange
8A Tower portion
8B Tower portion
9 Space
10 Screw connection
11 Threaded element
11A Threaded end portion
11B Polygon
12 Nut
12A Contact surface of the nut
20 Tool carrier
21A Roller, driven
21B Roller
22 Roller
23 Inner wall
24 Drive motor
25 Clutch
26 Angular encoder
30 Alignment element
30A Alignment surface
31 Lower platform
32 Upper platform
33 Stand
34 Vertical guide
35 Transverse guide
36 Spring arrangement
41 Stand base
42 Guide rod
49 Upper stand frame
50 Stand frame, height-adjustable
51 Electric drive
52 Electric drive
56 Screw drive
70 Holding tool
75 Counter-holding surface
75A Counter-holding surface
75B Counter-holding surface
77 Drive
78 Tool main body
79 Tool portion
80 Spring 86 Hydraulic pump
87 Hydraulic line
88 Energy module
95 Pivot stand
96 Slide
100 Cylinder housing
101 Support tube
102 Bottom side
110 Rotary sleeve
111 Gearing
112 Hydraulic port
113 Cone on bolt
114 Exchangeable socket
115 Piston
116 Internal thread
117 Spring
118 Hydraulic working chamber
121 Driver surface
125 Radially widened portion
126 Drive portion
130 Clamping jaw
131 Opening
140 Rod
141 Rotation-preventing securing means
142 Bolt
143 Longitudinal groove
147 Spring element
148 Gearing
149 Toothed gear
150 Passage opening
E Standing surface
N Surface normal

What is claimed is:

1. A device for tightening a screw connection (10) arranged along a flange connection (7), the flange connection (7) surrounding in a ring-shaped form a space, wherein the screw connection (10) comprises a threaded element (11) and a nut (12) screwed onto the threaded element (11), wherein the nut (12) is supported against the flange connection (7); the device comprising:
   a tool carrier (20) movable along the flange connection (7) and comprising a traction drive,
   a tool (5) arranged on the tool carrier (20) and configured to tighten the screw connection (10) and to rotate the nut (12) relative to the flange connection (7),
   a control unit (4) configured to move the tool carrier (20) in a longitudinal direction of the tool carrier (20) into a working position by traction drive control signals, wherein in the working position the tool (5) is situated opposite the screw connection (10) to be tightened, and further configured to perform, by tool control signals, tightening of the screw connection (10) and rotating of the nut (12),
   first rollers (21A, 21B) configured to support the tool carrier (20) on the flange connection (7), wherein the first rollers (21A, 21B) are mounted with horizontal rotary axles on the tool carrier (20),
   second rollers (22) mounted with substantially vertical rotary axles on the tool carrier (20), wherein the second rollers (22) are configured to laterally support the tool carrier (20) by a supporting action in an outward direction,
   wherein the tool carrier (20) comprises rigidly attached alignment elements (30) each comprising an alignment surface (30A) extending in a direction of travel of the tool carrier (20), wherein the alignment elements (30) are configured to provide a lateral guidance for the tool carrier (20) in an inward direction opposite to the supporting action in the outward direction provided by the second rollers (22), wherein the alignment surface (30A) has a surface normal (N) extending opposite to the supporting action in the outward direction provided by the second rollers (22),
   wherein the control unit (4) comprises a travel control module (4A) with a travel controller for moving the tool carrier (20) into the working position, wherein the travel controller is configured to stop the traction drive after a predefined travel length has been reached, wherein the predefined travel length is a target variable.

2. The device according to claim 1, wherein some of the first and second rollers (21A, 21B, 22) are driven rollers driven by the traction drive and some of the first and second rollers (21A, 21B, 22) are non-driven rollers.

3. The device according to claim 2, wherein each one of the driven rollers (21A) is mounted horizontally.

4. The device according to claim 2, further comprising a clutch (25) connected between each one of the driven rollers (21A) and a drive motor (24) of the traction drive.

5. The device according to claim 4, wherein the control unit (4) is configured to activate and/or deactivate the clutch (25) by clutch switching signals.

6. The device according to claim 5, wherein at least one of the first and second rollers (21A, 21B, 22) is coupled, free of slip, to an angle encoder (26) providing rotational angle coding.

7. The device according to claim 6, wherein the at least one of the first and second rollers (21A, 21B, 22) coupled to the angle encoder (26) is one of the non-driven rollers.

8. The device according to claim 7, wherein the at least one of the first and second rollers (21A, 21B, 22) coupled to the angle encoder (26) is one of the second rollers (22).

9. The device according to claim 6, wherein the angle encoder (26) is coupled by a chain or a toothed belt to the at least one of the first and second rollers (21A, 21B, 22).

10. The device according to claim 6, wherein the angle encoder (26) is connected to the travel control module (4A) of the control unit (4) so as to enable signal transmission to the travel control module (4A).

11. The device according to claim 1, further comprising a vertical guide (34) disposed on the tool carrier (20), wherein the tool (5) is mounted on the vertical guide (34) so as to be height-adjustable relative to the tool carrier (20).

12. The device according to claim 11, further comprising a transverse guide (35) comprising a guiding direction transverse relative to a longitudinal direction of the tool carrier (20), wherein the vertical guide (34) and/or the tool (5) is mounted on the transverse guide (36) so as to be displaceable relative to the tool carrier (20).

13. The device according to claim 12, wherein the transverse guide (35) comprises a spring arrangement (36) acting on the vertical guide (34) or on the tool (5) with a restoring force forcing the vertical guide (34) or the tool (5) into a central position relative to a platform (31) of the tool carrier (20).

14. The device according to claim 1, further comprising a documentation module (4B) configured to store a data set for each tightened screw connection, wherein the data set comprises one or more of the following parameters a) to c):
   a) an individual identifier of the respective screw connection (10) and/or of the position of the respective screw connection (10) on the flange connection (7),
   b) a tightening force of the tool (5) used for tightening the respective screw connection, c) an angle of rotation covered by the nut (12) relative to the flange connection (7).

15. The device according to claim 14, wherein the control unit (4) and the documentation module (4B) are disposed together in a common housing.

16. The device according to claim 1, wherein the tool is a screw-tensioning cylinder (5) operating axially relative to the screw connection, wherein the screw-tensioning cylinder (5) comprises: a cylinder housing (100) surrounding a hydraulic working chamber (118); an exchangeable socket (114) rotatable in the cylinder housing (100) by a first electric drive (51); and a rotary sleeve (101) configured to be placed on the nut (12) of the screw connection (10) with a positive locking action.

17. The device according to claim 16, wherein the screw-tensioning cylinder (5) further comprises a second electric drive (52) operatively connected to the rotary sleeve (110), wherein the second electric drive (52) is additionally configured to vertically adjust the screw-tensioning cylinder (5) relative to the tool carrier (20).

18. The device according to claim 16, further comprising a hydraulic pump (86), positioned spatially separated from the tool carrier (20), and a hydraulic line (87) connecting the hydraulic pump (86) to the hydraulic working chamber (118) of the screw-tensioning cylinder (5), wherein the hydraulic line (87) is flexible at least over a part of a length thereof.

19. The device according to claim 18, further comprising a pivotable stand (95) with one or more vertical pivot axes, wherein the stand (95) is equipped with fastening means for fastening the pivotable stand (95), and wherein a longitudinal portion of the hydraulic line (87) is mounted on the stand (95).

20. The device according to claim 19, wherein the pivotable stand (95) is configured to support the hydraulic line over an angle of rotation of approximately 360°.

21. The device according to claim 18, further comprising a slide (96) arranged movably on the tool carrier (20), wherein the slide (96) comprises a leadthrough for the hydraulic line (87), wherein the slide (96) is configured to move in a direction of travel of the tool carrier (20).

22. The device according to claim 1, further comprising an energy module (88), positioned spatially separated from the tool carrier (20), wherein the energy module (88) is configured to supply energy to the traction drive and to the tool (5), wherein an energy supply line connects the energy module (88) to the tool carrier (20), wherein the energy supply line is flexible at least over a part of a length thereof.

23. The device according to claim 22, wherein the control unit (4) is arranged on the energy module (88) or is arranged together with the energy module (88) on a support, wherein, for transmitting the traction drive control signals and the tool control signals, an electrical signal line connects the control unit (4) to the tool carrier (20), and wherein the electrical signal line is mechanically connected, at least over a part of a length thereof, to the energy supply line.

24. The device according to claim 22, further comprising a pivotable stand (95) with one or more vertical pivot axes, wherein the stand (95) is equipped with fastening means for fastening the pivotable stand (95), and wherein a longitudinal portion of the energy supply line is mounted on the stand (95).

25. The device according to claim 24, wherein the pivotable stand (95) is configured to support the energy supply line over an angle of rotation of approximately 360°.

26. The device according to claim 22, further comprising a slide (96) arranged movably on the tool carrier (20), wherein the slide (96) comprises a leadthrough for the energy supply line, wherein the slide (96) is configured to move in a direction of travel of the tool carrier (20).

* * * * *